Patented Jan. 24, 1950

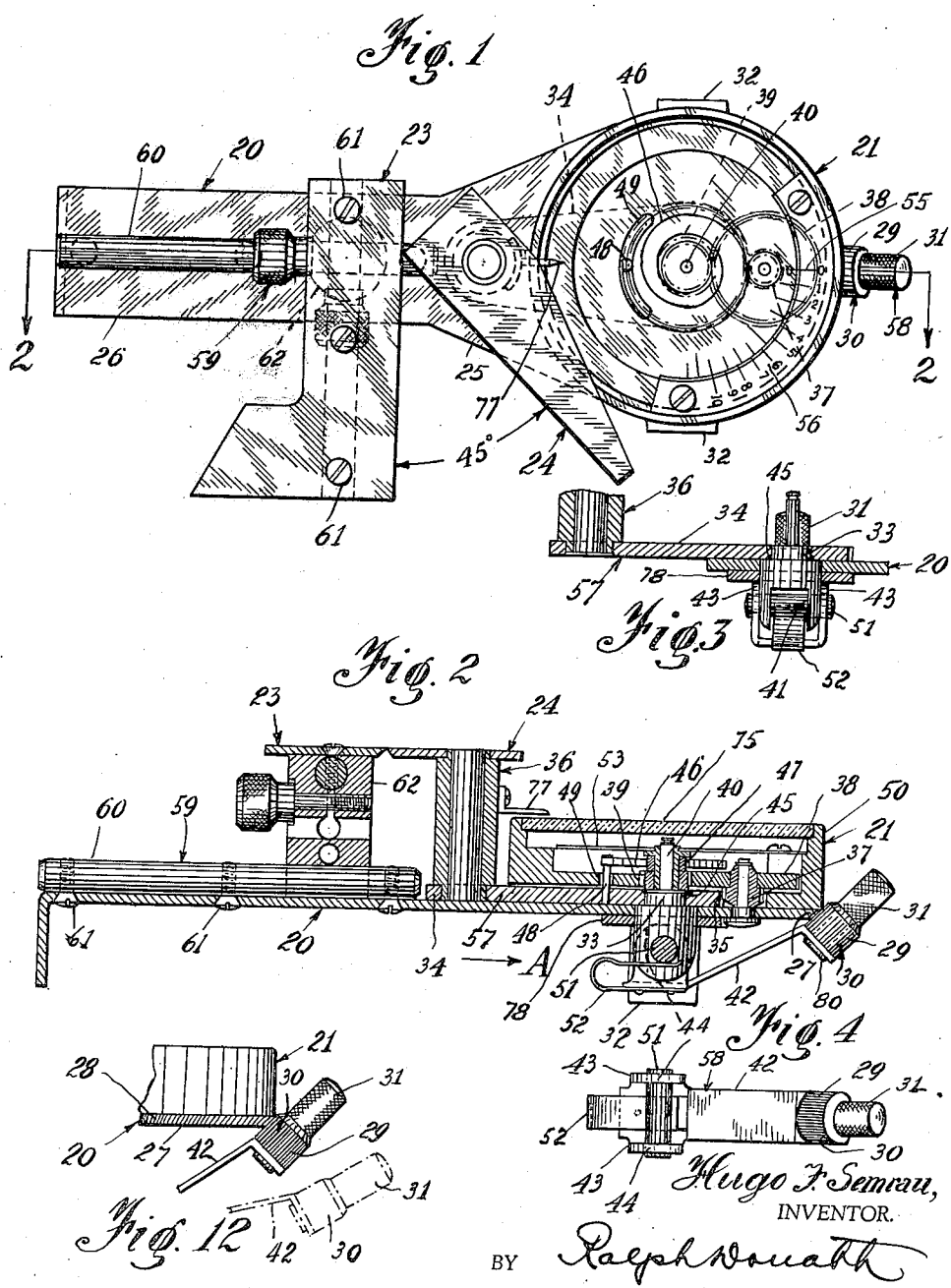

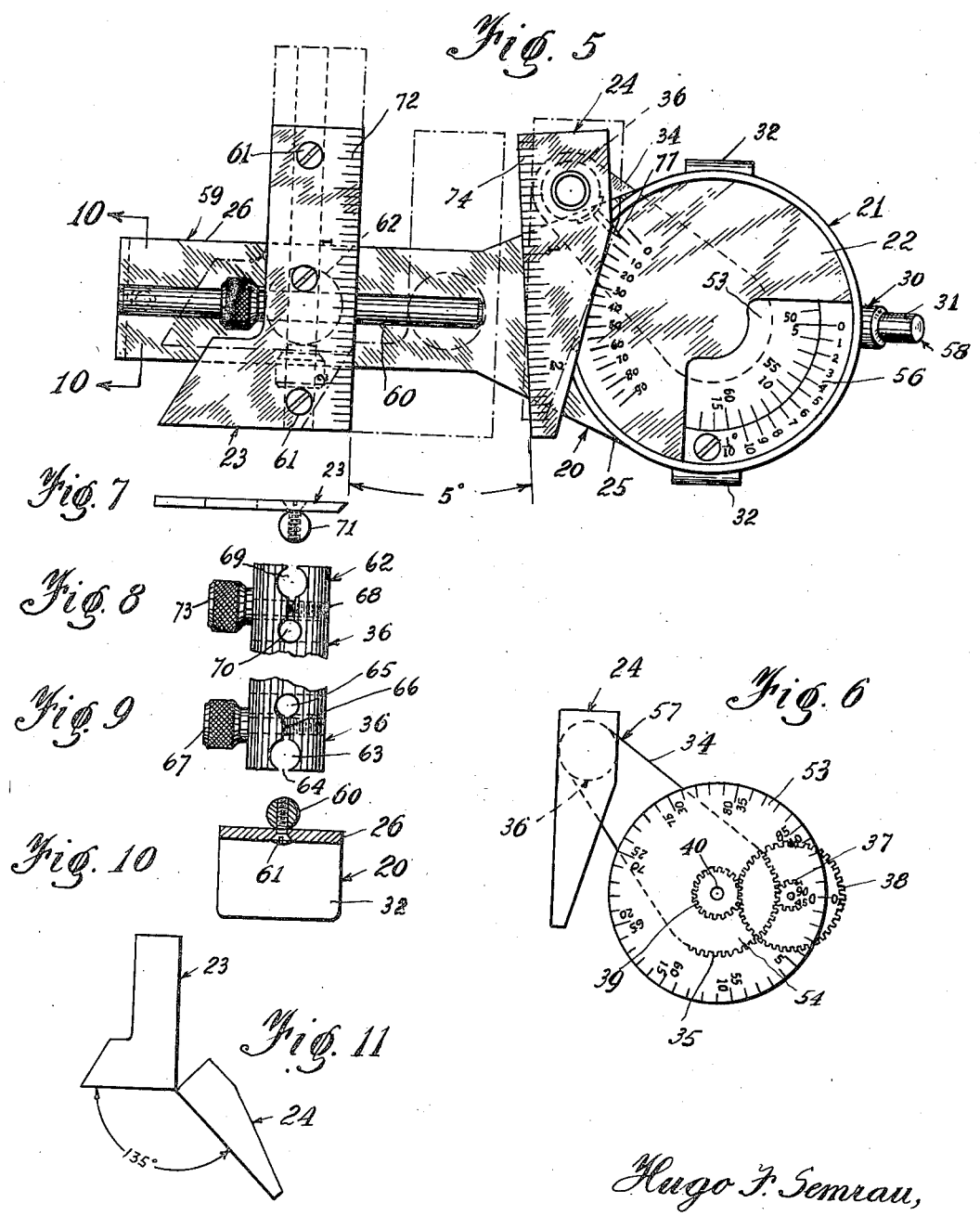

2,495,609

UNITED STATES PATENT OFFICE 2,495,609

DIAL PROTRACTOR

Hugo F. Semrau, Verona, Pa.

Application November 6, 1945, Serial No. 626,918

6 Claims. (Cl. 33—75)

This invention relates to improvements in dial protractors for accurately measuring or laying out angles of work.

One of the objects of the present invention is to provide a dial protractor by means of which angular measurements of objects can be quickly and extremely accurate and directly obtained.

Another object of the invention is to provide an instrument with a circular dial furnished with a vernier in which the graduations are greatly enlarged so that accurate readings of angular measurements may be had at a glance without the aid of a magnifying glass.

Still another object of the invention is to provide a dial protractor by means of which all angles may be measured from the vertex.

Yet another object of the invention is to provide a dial protractor which is capable to fine adjustment by ordinary manual manipulation.

Another object of the invention is the provision of round bars on which the measuring edge may be shifted, thereby providing an inexpensive but very accurate sliding mechanism.

Still another object of the invention is to provide a dial protractor with a mechanism for rough and fine adjustment operable from a unitary source and means for locking same in any desired position.

Another object of the invention is to provide a dial protractor which is compact, light in weight and of a size favorable with instruments in every day use, dust-proof, easy to manipulate, extremely accurate, readable directly and inexpensive to manufacture.

To the accomplishment of these and such other objects as may hereafter appear, the invention consists of the novel construction, combination and arrangement of parts herein specifically described and illustrated in the drawings, wherein is shown an embodiment of the invention, but it is to be understood that changes, variations and modifications may be resorted to which come within the scope of the claims hereunto appended.

In the accompanying drawings wherein like numerals of reference designate corresponding parts throughout the several views, Figure 1 is a top plan view of the device showing the instrument set to indicate a 45 degree angle, the dial cover being removed to show details.

Figure 2 is a sectional view along line 2—2 in Figure 1.

Figure 3 is a fragmentary sectional view of the mechanism for fine adjustment and looking in the direction of arrow A, in Figure 2.

Figure 4 is a bottom view of Figure 3 with parts eliminated.

Figure 5 is a top plan view of the instrument showing the measuring edges set for an angle of 5 degrees.

Figure 6 is a top plan view of the dial including the means for transmitting the angular movement of the measuring edge to a graduated dial indicating magnified degree graduations.

Figure 7 is an end view of the sliding edge including the cylindrical bar to which it is secured.

Figure 8 is a fragmentary view of the upper portion of the post in which the sliding edge slides.

Figure 9 is a fragmentary view of the lower part of the post which slides on the base, turned around for 90 degrees.

Figure 10 is a sectional view on line 10—10 in Figure 5.

Figure 11 is a diagrammatic view of the sliding and measuring-edges showing, as an example, how a larger angle than 90 degrees may be measured with the instrument.

Figure 12 is a fragmentary outline view showing the serrated edge of the base in mesh with a serrated pinion; the dot and dash lines show the pinion disengaged for rough measuring or locking.

In general, the dial protractor consists of a base 20, a gear mechanism housing 21 including a dial 22, a sliding edge 23 and a measuring edge 24.

Base 20 comprises the partly circular gear-housing support end 25 tapering into an elongated, parallel sliding-edge end 26 in which the rim 27 of the former is provided with fine serrations 28 around the semi-circular portion of said rim 27 adapted to be in mesh with the fine serrations 29 of a pinion 30 having a knurled knob extension 31. The base 20 is also provided with three or more legs 32 on which the instrument stands.

Referring now to Figures 2, 3 and 6, a stud 33, in concentric relation with said serrated rim 27 of base 20, is secured to a measuring-edge arm 34 (see Figure 6); one end of which is provided with teeth 35 in concentric relation with stud 33, and the other end has secured thereon in any suitable manner an upwardly extending post 36, on which the measuring edge is secured.

In mesh with the teeth 35 of arm 34 is a pinion 37 which carries a gear 38 in mesh with the pinion 39, mounted on the upwardly extending center-pin 40 of stud 33. The lower end of the latter is bifurcated as indicated by the numeral 41.

The aforesaid pinion 30, including the integral knob-extension 31 is suitably mounted for free rotation and is adapted to be in- or out of mesh with the fine serrations 28 of the rim 27 at a suitable angle on one end of the bracket 42, while the opposite end terminates into a pair of ears 43, the free ends of which terminate into a cam-edge 44. It will be noted that the stud 33 is shown peened over at the shoulder as indicated by the numeral 45 in order to be prevented from turning on the measuring-edge arm 34.

A hair-spring 46, one end of which is secured to the bushing 47 and the other end of which is secured to a pin 48 is secured to the measuring-edge arm 34. This pin 48 moves in an arcuate slot 49 (Figure 1) of the gear housing 50 in order to adjust the tension of the same.

The said hair spring 46 serves to absorb the play or backlash of the gear train 35, 37, 38 and 39. The inner end of the hair spring 46 is secured to the bushing 47 in any suitable manner. The outer end of hair spring 46 is fastened to pin 48, which is screwed in arm 34 and is free to move in arcuate slot 49. By turning the arm 34 a quarter turn in counter-clockwise direction, the hair spring 46 opens or decreases its tension, but on account of the 1 to 8 ratio of the gear train the inner end of the hair spring is wound with two turns, thereby increasing its tension and absorbing the backlash or play of the train of gears.

The bifurcated lower end of stud 33 and the cam-ears 43 have a common stub-shaft 51 as will be understood. Underneath said cam-ears 43 is secured thereon a flat U-shaped spring-member 52, the free end of which is in contact with stub-shaft 51 as best shown in Figures 2, 3 and 4.

The angular movement of the measuring edge 24 is transmitted by the arm 34 to pinion 37 and gears 38 to pinion 39 which carries the hair-spring 46 and a graduated dial 53. This dial is divided into 45 equally spaced graduations in which each line represents one degree and is marked with two sets of figures, one reading from 0 to 45 degrees and the other one from 45 degrees to 90 degrees.

The ratio, for an example as shown in the drawing, of the measuring-edge arm segment 54 to pinion 39 is 1 to 8 that is, a quarter turn or 90 degree movement of the measuring-edge 24 is indicated at the zero line 55 in Figure 1 by two full turns of the graduated dial 53; a 45 degree movement of the measuring-edge 24 is indicated at the zero line 55 by one full turn of the graduated dial 53, thus the graduation on dial 53 indicates the angular movement and position of the measuring edge 24 on an enlarged scale. A vernier scale 56 is also provided for sub-dividing one degree in tenths of a degree or 60 minutes.

At this time, attention is called with the wide apart graduations of the vernier scale and the dial graduations of the instrument which is one of the important features of this invention.

The measuring-edge unit 57 rotatably mounted on stud 33 is limited to a quarter turn only and any position within this quarter turn can be accurately locked by manipulating the knob 31 of the pinion 30 of the locking and fine adjustment mechanism 58.

The sliding-edge mechanism 59 consists of a cylindrical bar 60 centrally secured to the sliding-edge end 26 of the base 20 by means of screws 61 on which is slidably mounted the upright sliding-edge post 62 through the aperture 63, open at the lowermost end 64 shown in Figure 9; this aperture 63 has a correlated, parallelly disposed aperture 65 and both apertures 63 and 65 have a common slotted portion 66 so as to permit clamping of the post 62 around the bar 60 in any desired position by means of clamp-screws 67.

The upper portion 68 of post 62 also has a pair of horizontal apertures 69 and 70 in which aperture 69 is adapted to receive the cylindrical bar 71 secured to the underside of the sliding-edge 23. It is to be noted, that apertures 63 and 65 at the lower end of post 62 and the apertures 69 and 70 at the upper end of post 62 are located at right angles or perpendicular to each other.

The sliding-edge 23, preferably L-shaped as shown, is provided with graduations 72.

Between apertures 63 and 65, and 69 and 70 clamping screws 67 and 73 are provided which serve to tighten the post 62 to sliding bar 60 and 71 respectively in any desired perpendicular position.

The movement of the sliding-edge 23 in perpendicular directions permits contacting the measuring-edge 24 at any angular position and consequently is adapted to measure any angle from the vertex, and by moving the sliding-edge 23 away from the measuring-edge 24 any magnitude of an angle may be readily measured.

Both, the sliding-edge and the measuring-edge are provided with inch graduations 72 and 74 respectively thereby providing means for measuring or inspecting the length of tapers or shoulders of angular objects.

As heretofore mentioned the magnification of the graduation of the dial protractor herewith described is based on a ratio of 1:8 but it will be understood that other ratios may be employed to obtain the same results.

The graduated dial 53 shows the graduations expressed in degrees, of course it is obvious that the graduations may be expressed in taper per inch or foot, Morse, B & S or Jarno taper etc. if desired.

The gear housing 50 is provided with a cover or lid 75 of transparent material in which approximately ¾ of its area is masked off showing only about ¼ of the graduated dial 53 including the vernier 56. A pointer 77 is shown secured to post 36 pointing to the graduations on cover 75 and mainly serving to roughly and rapidly set the angular position of the measuring edge 24 after which the exact angular position is set by means of the fine adjusting mechanism 58.

The present invention contemplates the provision of means to effect first, a rough or approximate setting of the desired angular position of the measuring-edge 24, and second, the final or fine and accurate position of the measuring-edge 24. Both, the rough and accurate settings are effected by the knob 31 and pinion 30, the latter being rotatably mounted on the knob-extension 80 which is secured to the bracket 42. The rough and accurate settings are effected in the following manner:

It is assumed that the sliding edge 23 is in the desired position, next, the measuring-edge 24 is rough set into an approximate angular position by slightly forcing the knob 31 downwardly thereby causing the pinion 30 to be brought out of mesh of the normally engaged serrated rim 27 of the housing support end 26 of base 20. The bracket 42 of the fine adjustment mechanism 58 pivots on stub-shaft 51 supported in the bifurcated end 41 of stud 33. One end of the U-shaped flat spring 51 is secured to the underside of the cam-ears 43 and 44 while the free end rests under tension against the stub-shaft 51 as shown in Figures 2 and 4. The cam portions of the ears 43, 44 are always in frictional contact with a washer 78.

It will be observed, that since the stud 33 is secured to the measuring-edge arm 34, the stud 33 will take part in any angular movement of the measuring-edge 24 and consequently the bracket 42 including the pinion 30 and knob 31 will follow the circular movement of the measuring-edge 24.

Reversing the operation; the bracket 42, due to the action of the spring-member 52 forces the pinion 30 into mesh with the serrations 28 of the rim 27 of housing-support end 25 of the base 20 while the cam-ears of the bracket 42 now freely ride on washer 78. By turning the knob 31 the angular movement is transmitted to the measuring-edge 24 by bracket 42, stub-shaft 51, stud 33 and measuring-edge arm post 36.

Obviously, the fine serrations of the pinion 30 and the rim 27 permit a fine and smooth angular adjustment of the measuring-edge 24.

In order to lock the measuring-edge 24 in any desired angular position, a slight downward pull of the knob 31 will disengage the pinion 30 from mesh with rim 27 and at the same time bring the cam portion 44 of the cam-ears 43 into frictional contact with the face of the washer 78 thereby clamping together the housing-support end of the base 20 against the measuring-edge arm 34, thus preventing any movement of the measuring edge 24.

Between the action of disengaging pinion 30 from the serrated rim 27 and the final locking action by the excentric cam 44 it is still possible to move arm 42 in an oscillating motion under light frictional contact for a quick setting of the measuring edge 24, for example, from zero to 70 degrees.

Element 30 will remain in "down" position as shown in Figure 12 in dot and dash lines due to the wedging action of the excentric cam 44 on washer 78.

In order to set the measuring-edge 24 to a new angular position, it is required to release the clamping action of the cam 44 and washer 78 by moving the knob 31 upwardly, thereby causing the pinion 30 to mesh with the rim 27 of the base 20; both actions, the releasing of the clamping action and the meshing of the pinion 30 and rim 27 are simultaneous.

The above described dial protractor may be used by machinists, mechanics, draftsmen etc. especially when great accuracy is desired and without the use of a magnifying glass.

I claim:

1. A dial protractor of the class described comprising a base; a pair of edges normally disposed opposite each other and both movably mounted on said base; one of said edges serving as a sliding edge and the other one serving as a measuring edge for measuring the degree of angles; a gear-housing mounted on said base provided with a centrally mounted stud having a center-pin; a train of gears in said housing; said sliding edge mounted for guiding in radial alignment with said center-pin and in a perpendicular direction with respect to the sliding base edge end of said base; an elongated cylindrical bar secured to the upper face of said base in radial alignment with said center-pin; said sliding edge having secured to the underside thereof and in parallel alignment with said sliding edge an elongated cylindrical bar; a post provided at the upper and the lower ends with horizontally disposed apertures positioned at right angles to snugly receive the cylindrical bars of said base and said sliding edge; said post having correlated parallel apertures and slots to permit clamping of the sliding edge to said post by means of screws; said measuring edge mounted for movement in angular positions in respect to said sliding edge; a rotatable dial indicating equal degree divisions rotatably mounted on the center-pin of said stud in cooperation with a fixed vernier scale secured to the rim of said gear housing for measuring a fractional part of one of said divisions; a protractor arm having one end secured to said measuring edge and the other end thereof being provided with peripheral gear teeth in mesh with said train of gears adapted to rotate said dial at a certain ratio in respect to the angular motion of said measuring edge and means for oscillating the latter about said stud.

2. A dial protractor of the class described comprising a base; a pair of edges normally disposed opposite each other and both movably mounted on said base; one of said edges serving as a sliding edge and the other one serving as a measuring edge for measuring the degree of angles; a gear-housing mounted on said base provided with a centrally mounted stud having a center-pin; a train of gears in said housing; said sliding edge mounted for sliding in radial alignment with said center-pin and in a perpendicular direction with respect to the sliding base edge end of said base; an elongated cylindrical bar secured to the upper face of said base in radial alignment with said center-pin; said sliding edge having secured to the underside thereof and in parallel alignment with said sliding edge an elongated cylindrical bar; a post provided at the upper and the lower ends with horizontally disposed apertures positioned at right angles to snugly receive the cylindrical bars of said base and said sliding edge; said post having correlated parallel apertures and slots to permit clamping of the sliding edge to said post by means of screws; said measuring edge mounted for movement in angular positions in respect to said sliding edge; a rotatable dial indicating equal degree divisions rotatably mounted on the center-pin of said stud in cooperation with a fixed vernier scale secured to the rim of said gear-housing for measuring a fractional part of one of said divisions; a protractor arm having one end secured to said measuring edge and the other end thereof being provided with peripheral gear teeth in mesh with a pinion journaled in said gear-housing; a gear, concentrically secured to said pinion, in mesh with a second pinion rotatably mounted on the center-pin of said stud; said pinions and gears intergeared to form said train of gears adapted to rotate said dial at a certain ratio in respect to the angular motion of said measuring edge and means for oscillating the latter about said stud.

3. A dial protractor comprising a base; a pair of edges normally disposed opposite each other and both movably mounted on said base; one of said edges serving as a sliding edge and the other one serving as a measuring edge for measuring the degree of angles; a gear-housing mounted on said base provided with a centrally mounted stud having a center-pin; means for guiding said sliding edge for movement in radial alignment with the center-pin of said stud and in a perpendicular direction; said means comprising an elongated cylindrical bar secured to the upper face of said base in radial alignment with said center-pin; said sliding edge having secured to the underside thereof and in parallel alignment with the sliding edge an elongated cylindrical bar; a post, provided at the upper and the lower ends with horizontally disposed apertures positioned at right angles to snugly receive the cylindrical bars of said base and said sliding edge; said apertures being open at the top and bottom, said post having correlated, parallel apertures and slots to permit clamping of the sliding edge to said post by means of clamping-screws; said measuring edge mounted to be moved in angular positions in respect to said sliding edge; a rotatable dial, indicating equal degree divisions, mounted on the uppermost portion of the center-pin of said stud and in cooperation with a fixed vernier scale on said housing for measuring a fractional part of one of said divisions; a train of gears in said housing, a protractor arm fixed on said stud, one end secured to said measuring edge and the other semi-circular end thereof being provided with peripheral gear teeth in mesh with said train of gears by means of which said dial is rotated at a certain ratio in respect to the angular motion of said measuring edge; unitary means for oscillating the measuring edge about said stud and rotating said dial about said center-pin and means for locking the measuring edge by said unitary means in any desired angular position.

4. A dial protractor comprising a base; a pair edges normally disposed opposite each other and both movably mounted on said base; one of said edges serving as a sliding edge and the other one serving as a measuring edge for measuring the degree of angles; a gear-housing mounted on said base provided with a central stud having a center-pin; means for guiding said sliding edge for movement in radial alignment with said center-pin and a perpendicular direction with respect to the sliding base edge end of said base; said guiding and sliding means comprising an elongated cylindrical bar secured to the upper face of said base in radial alignment with said center pin; said sliding edge having secured to the underside thereof and in parallel alignment with the sliding edge an elongated cylindrical bar; a post provided at the upper and the lower ends with horizontally disposed apertures positioned at right angles to snugly receive the cylindrical bars of said base and said sliding edge; said post having correlated parallel apertures and slots to permit clamping of the sliding edge to said post by means of screws said measuring edge mounted to be moved in angular positions in respect to said sliding edge; a rotatable graduated dial in co-operating with a fixed vernier scale on said housing for measuring a fractional part of one of said graduations of said dial; a protractor arm having one end secured to a post provided with a pointer and on which the measuring edge is mounted and the other semi-circular end of said protractor arm being provided with peripheral gear teeth in mesh with a train of gears by means of which the dial is being rotated at any desired ratio in respect to the angular motion of said measuring edge; a transparent cover for said gear-housing on which a three-quarter sector is masked off so as to expose only a quarter sector of the dial including the vernier scale; graduations indicating degrees marked on said masked off sector cooperating with said pointer secured to said protractor arm post to indicate the movement in degrees of said measuring edge; means for oscillating the measuring edge for rough or fine measuring of angles and means for locking the measuring edge in any desired position by said oscillating means.

5. A dial protractor comprising a base; a pair of edges normally disposed opposite each other and both movably mounted on said base; one of said edges serving as a sliding edge and the other said edges serving as a measuring edge for measuring one the degree of angles; a gear-housing mounted on said base provided with a central stud having a center-pin; said sliding edge mounted for guiding in radial alignment with said center-pin and in a perpendicular direction with respect to the sliding base edge end of said base; said guiding accomplished by means of an elongated bar secured to the upper face of said base in radial alignment with said center pin; said sliding edge having secured to the underside thereof and in parallel alignment with said sliding edge an elongated bar; a post provided at the upper and the lower ends with horizontally disposed apertures positioned at right angles to snugly receive said elongated bars of said base and said sliding edge; said post having correlated parallel apertures and slots to permit clamping of the sliding edge to said post by means of screws; said measuring edge mounted to be moved in angular positions in respect to said sliding edge; a rotatable, graduated dial disposed in said gear housing and secured to said center pin for indicating fine or micrometric angular measurements in cooperation with a fixed vernier scale mounted on the rim of said gear housing for measuring a fractional part of one of the graduations of said dial; a train of gears mounted in said housing; means to greatly enlarge the spaces between the graduations of said dial to facilitate reading of the measurements, said means consisting of said train of gears between the measuring edge and the dial; a cover for said gear-housing exposing only a quarter sector of the dial including the vernier scale; a protractor arm provided with an upright post having one end secured to said post on top of which said measuring edge is mounted and the other semi-circular end of said protractor arm being provided with peripheral gear teeth in mesh with said train of gears; graduations indicating degrees marked on the exterior of said cover in cooperation with a pointer secured to said upright post to roughly indicate in degrees the movement of the measuring edge; means for oscillating the measuring edge for rough or fine measuring of angles and means for locking the measuring edge in any desired position by said means.

6. A dial protractor comprising a flat base; a pair of edges normally disposed opposite each other and both movably mounted on said flat base; said base having an enlarged semi-circular extension provided with peripheral serrations; one of said edges serving as a sliding edge and the other one serving as a measuring edge; a gear-housing mounted on said semi-circular extension; a train of gears and a central stud in said housing; a protractor arm having one end secured to an upright post on which said measuring edge is mounted and the other semi-circular end of said protractor arm being provided with peripheral gear teeth in mesh with said train of gears; said stud having an upstanding center-pin and a bifurcated depending extension secured to said protractor arm, said extension arranged below the underside of said base; a graduated dial secured to the uppermost portion of said center-pin and a bracket having one end provided with cam-ears pivoted on a stub-shaft on said bifurcated stud extension and the other end of said bracket provided with a rotatably mounted combined knob and serrated pinion extending outwardly of said base and adapted to selectively engage or disengage the serrations of said base; a washer loosely engaging the depending end of said stud in abutment with the underside of said base and adapted to be in or out of frictional contact with said base and cam-ears of said bracket; a spring secured to the cam-ear end of said bracket and in contact with the underside of said stub shaft; said serrated pinion normally held in mesh with the semi-circular, serrated portion of said base for fine or micrometric measuring by turning the serrated pinion knob; a cover for said gear-housing having graduations indicating degrees for rough measuring marked on top of the same, said graduations in cooperation with a pointer secured to the upright post of said protractor arm to which the measuring edge is mounted; said serrated pinion brought out of engagement with the serrated portion of said base by a slight downward push of the pinion knob after which said knob is oscillated until the pointer indicates the rough angular position of the measuring edge and means for locking the latter in any desired position.

HUGO F. SEMRAU.

REFERENCES CITED

The following references are of record in the file of this patent:

UNITED STATES PATENTS

| Number | Name | Date |
|---|---|---|
| 70,547 | Graham | Nov. 5, 1867 |
| 924,846 | Simon | June 15, 1909 |
| 1,039,901 | Constantinescu | Oct. 1, 1912 |
| 1,254,218 | Eskelinen | Jan. 22, 1918 |
| 1,384,105 | Starrett et al. | July 12, 1921 |
| 1,422,641 | Walters | July 11, 1922 |
| 1,632,613 | Lopez | June 1, 1927 |
| 1,637,933 | Galvin | Aug. 2, 1927 |
| 2,000,926 | Cox | May 14, 1935 |
| 2,070,675 | Niemeyer | Feb. 16, 1937 |